United States Patent
Tavildar et al.

(10) Patent No.: US 10,477,538 B2
(45) Date of Patent: Nov. 12, 2019

(54) TIME HOPPING IN DEVICE-TO-DEVICE TRANSMISSIONS

(71) Applicant: QUALCOMM Incorporated, San Diego, CA (US)

(72) Inventors: Saurabha Rangrao Tavildar, Jersey City, NJ (US); Kapil Gulati, Long Branch, NJ (US); Shailesh Patil, Raritan, NJ (US); Sudhir Kumar Baghel, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/645,852

(22) Filed: Mar. 12, 2015

(65) Prior Publication Data

US 2015/0271818 A1    Sep. 24, 2015

Related U.S. Application Data

(60) Provisional application No. 61/955,676, filed on Mar. 19, 2014.

(51) Int. Cl.
*H04B 1/69* (2011.01)
*H04W 72/04* (2009.01)
(Continued)

(52) U.S. Cl.
CPC .......... *H04W 72/0446* (2013.01); *H04B 1/69* (2013.01); *H04L 1/1887* (2013.01);
(Continued)

(58) Field of Classification Search
CPC ............. H04B 1/69; H04B 2001/6908; H04W 72/0446
(Continued)

(56) References Cited

U.S. PATENT DOCUMENTS

2007/0080154 A1* 4/2007 Ott .......................... B23K 9/095
219/132
2007/0248114 A1* 10/2007 Jia ....................... H04B 1/71632
370/465
(Continued)

FOREIGN PATENT DOCUMENTS

CN    102792622 A    11/2012
EP     2315382 A2     4/2011
(Continued)

OTHER PUBLICATIONS

"On Scheduling Procedure for D2D", 3GPP TSG-RAN WG1 Meeting #67 R1-140778, Feb. 14, 2014, pp. 1-5.*
(Continued)

*Primary Examiner* — Kevin M Burd
(74) *Attorney, Agent, or Firm* — Holland & Hart LLP

(57) ABSTRACT

Apparatuses, systems, and devices are described for transmissions and retransmissions of device-to-device (D2D) communications. A D2D message may be transmitted during an initial communications period, followed by one or more retransmissions. A device may transmit an initial transmission, determine a time hopping pattern for the retransmission(s), and determine a transmission resource for the retransmission(s) based at least in part on a resource of the initial transmission and the time hopping pattern. The messages may include, for example, a scheduling assignment (SA) for data transmission, or data transmissions from a transmitting device. Time hopping patterns may be determined based on times and/or frequencies of the initial transmission. A base station may transmit a message to a transmitting device that indicates one or more time hopping patterns that are to be used for the transmissions.

26 Claims, 13 Drawing Sheets

(51) Int. Cl.
  *H04L 5/00* (2006.01)
  *H04W 48/10* (2009.01)
  *H04W 52/02* (2009.01)
  *H04L 1/18* (2006.01)
  *H04L 1/00* (2006.01)

(52) U.S. Cl.
  CPC .......... *H04L 1/1896* (2013.01); *H04L 5/0005* (2013.01); *H04W 48/10* (2013.01); *H04W 52/0216* (2013.01); *H04W 72/042* (2013.01); *H04W 72/048* (2013.01); H04B 2001/6908 (2013.01); H04L 2001/0093 (2013.01); Y02D 70/122 (2018.01); Y02D 70/1242 (2018.01); Y02D 70/1262 (2018.01); Y02D 70/1264 (2018.01); Y02D 70/142 (2018.01); Y02D 70/146 (2018.01); Y02D 70/21 (2018.01); Y02D 70/40 (2018.01)

(58) Field of Classification Search
  USPC ................................................ 375/130, 138
  See application file for complete search history.

(56) References Cited

U.S. PATENT DOCUMENTS

| | | | | |
|---|---|---|---|---|
| 2008/0273549 | A1* | 11/2008 | Orfanos | H04W 72/02 370/462 |
| 2012/0281730 | A1* | 11/2012 | Hulvey | H04B 1/7156 375/136 |
| 2013/0010833 | A1 | 1/2013 | Ogawa et al. | |
| 2014/0003226 | A1* | 1/2014 | Amir | H04L 45/04 370/216 |
| 2014/0029567 | A1* | 1/2014 | Grady | H04W 84/18 370/330 |
| 2014/0119306 | A1* | 5/2014 | Yang et al. | 370/329 |
| 2014/0269558 | A1* | 9/2014 | Sartori et al. | 370/329 |
| 2016/0278009 | A1* | 9/2016 | Sorrentino | H04W 72/02 |
| 2016/0338127 | A1* | 11/2016 | Matsumoto | H04W 76/14 |

FOREIGN PATENT DOCUMENTS

| | | |
|---|---|---|
| EP | 2555451 A1 | 2/2013 |
| WO | WO-2011121925 A1 | 10/2011 |

OTHER PUBLICATIONS

Ericsson 3GPP TSG-RAN WGI Meeting #76. RI-140778. Prague, Czech Republic, Feb. 10-14, 2014.*

ISA/EPO, International Search Report and Written Opinion of the International Searching Authority, Int'l Appl. No. PCT/US2015/020341, dated Jul. 2, 2015, European Patent Office, Rijswijk, NL, 11 pgs.

IPEA/EPO, Second Written Opinion of the International Preliminary Examining Authority, Int'l Appl. No. PCT/US2015/020341, dated Mar. 16, 2016, European Patent Office, Rijswijk, NL, 7 pgs.

* cited by examiner

TIME HOPPING IN DEVICE-TO-DEVICE TRANSMISSIONS

CROSS REFERENCES

The present application for patent claims priority to U.S. Provisional Patent Application No. 61/955,676 by Tavildar et al., entitled "Time Hopping in Device-to-Device Transmissions" filed Mar. 19, 2014, and assigned to the assignee hereof.

BACKGROUND

Field of Disclosure

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Description of Related Art

Generally, a wireless multiple-access communications system may include a number of base stations, each simultaneously supporting communication for multiple mobile devices or other user equipment (UE) devices. Base stations may communicate with UEs on downstream and upstream links. Each base station has a coverage range, which may be referred to as the coverage area of the cell. Device-to-device (D2D) communications involve direct wireless communications between UEs either within or beyond the coverage area of a base station. D2D communications may be facilitated by scheduling transmissions from a base station if the devices are within a coverage area. In some cases, D2D communications are utilized by public safety officers such as police, fire and rescue teams, for example.

In many situations, wireless transmissions in D2D communications may encounter interference from various sources, including wireless network base stations and other UEs that may be transmitting, for example. Thus, it would be desirable for D2D communications to provide for enhanced power savings techniques as well as to provide for enhanced interference mitigation.

SUMMARY

The described features generally relate to one or more improved systems, methods, and/or apparatuses for transmissions and retransmissions of D2D communications. According to various examples, a D2D message may be transmitted during an initial communications period, followed by one or more retransmissions for a certain time period. A device may transmit an initial transmission, determine a time hopping pattern for the retransmission(s), and determine a transmission resource for the retransmission(s) based at least in part on a resource of the initial transmission and the time hopping pattern. In certain examples, messages may be retransmitted according to the time hopping pattern in order to enhance reception of messages at a receiving device. The messages may include, for example, a scheduling assignment (SA) for data transmission, or data transmissions from a transmitting device. Time hopping patterns may be determined, for example, based on times and/or frequencies of the initial transmission. In some examples, a base station may transmit a message to a transmitting device that indicates one or more time hopping patterns that are to be used for the transmissions.

In a first set of illustrative embodiments, a method of wireless communications may include transmitting a message to one or more devices using a first transmission resource; determining a time hopping pattern for retransmission of the message; determining at least a second transmission resource based at least in part on the first transmission resource and the time hopping pattern; and retransmitting the message using the second transmission resource. The second transmission resource may be determined, for example, based at least in part on a frequency of the first transmission resource. The message may include one or more of data transmitted to the one or more devices or a scheduling assignment for one or more subsequent transmissions of data. The second transmission resource may be determined based at least in part on a target identification included in the message, in some examples. In other examples, the second transmission resource may be determined based at least in part on a subframe number of the first transmission resource.

In certain examples, the time hopping pattern may be a preset time hopping pattern. The time hopping pattern may identify, for example, at least the second transmission resource as a time and frequency diverse resource relative to the first transmission resource. Different time hopping patterns may have different mean inter-arrival times between retransmissions of the message. In some examples, the time hopping pattern may identify a number of retransmissions of the message, and the determining at least the second transmission resource may include determining a number of transmission resources corresponding to the number of retransmissions.

In some examples, the method may include receiving the time hopping pattern from a base station. The receiving may include receiving the time hopping pattern in downlink control information (DCI), for example. In some examples, the DCI may be scrambled with a device-to-device (D2D) identification. The receiving may include, for example, receiving the time hopping pattern in one or more of a connection setup, a radio resource control (RRC) configuration, or via RRC messaging. In other examples, the receiving may include receiving the time hopping pattern in a system information block (SIB) broadcast from the base station. The message may be transmitted, for example, in a device-to-device (D2D) broadcast transmission.

In a second set of illustrative embodiments, an apparatus of wireless communications may include means for transmitting a message to one or more devices using a first transmission resource; means for determining a time hopping pattern for retransmission of the message; means for determining at least a second transmission resource based at least in part on the first transmission resource and the time hopping pattern; and means for retransmitting the message using the second transmission resource.

In certain examples, the apparatus may implement one or more aspects of the first set of illustrative embodiments described above.

In a third set of illustrative embodiments, an apparatus of wireless communications may include a processor; memory in electronic communication with the processor; and instructions stored in the memory. The instructions may be executable by the processor to: transmit a message to one or more devices using a first transmission resource; determine a time hopping pattern for retransmission of the message; determine at least a second transmission resource based at least in part on the first transmission resource and the time hopping pattern; and retransmit the message using the second transmission resource.

In certain examples, the instructions may be configured to cause the processor to implement one or more aspects of the first set of illustrative embodiments described above.

In a fourth set of illustrative embodiments, a non-transitory computer-readable medium may store instructions executable by a processor to: transmit a message to one or more devices using a first transmission resource; determine a time hopping pattern for retransmission of the message; determine at least a second transmission resource based at least in part on the first transmission resource and the time hopping pattern; and retransmit the message using the second transmission resource.

In certain examples, the instructions may be configured to cause the processor to implement one or more aspects of the first set of illustrative embodiments described above.

In a fifth set of illustrative embodiments, a method of wireless communications may include receiving a message from a device using a first transmission resource; determining a time hopping pattern for retransmission of the message; determining at least a second transmission resource based at least in part on the first transmission resource and the time hopping pattern; and receiving at least one retransmission of the message using the second transmission resource. In some examples, the second transmission resource may be determined based at least in part on a frequency of the first transmission resource. The message may include, in certain examples, one or more of data or a scheduling assignment for one or more subsequent transmissions of data.

In certain examples, the second transmission resource may be determined based at least in part on a target identification included in the message. In other examples, the second transmission resource may be determined based at least in part on a subframe number of the first transmission resource. The time hopping pattern may be a preset time hopping pattern. The time hopping pattern may be based at least in part on the first transmission resource, in some examples. In some examples, the time hopping pattern may identify at least the second transmission resource as a time and frequency diverse resource relative to the first transmission resource. The time hopping pattern, in other examples, may identify a number of retransmissions of the message, and the determining at least the second transmission resource may include determining a number of transmission resources corresponding to the number of retransmissions. The message may be transmitted in a device-to-device (D2D) broadcast transmission, according to some examples.

In a sixth set of illustrative embodiments, an apparatus of wireless communications may include means for receiving a message from a device using a first transmission resource; means for determining a time hopping pattern for retransmission of the message; means for determining at least a second transmission resource based at least in part on the first transmission resource and the time hopping pattern; and means for receiving at least one retransmission of the message using the second transmission resource.

In certain examples, the apparatus may implement one or more aspects of the fifth set of illustrative embodiments described above.

In a seventh set of illustrative embodiments, an apparatus of wireless communications may include a processor; memory in electronic communication with the processor; and instructions stored in the memory. The instructions may be executable by the processor to: receive a message from a device using a first transmission resource; determine a time hopping pattern for retransmission of the message; determine at least a second transmission resource based at least in part on the first transmission resource and the time hopping pattern; and receive at least one retransmission of the message using the second transmission resource.

In certain examples, the instructions may be configured to cause the processor to implement one or more aspects of the fifth set of illustrative embodiments described above.

In an eighth set of illustrative embodiments, a non-transitory computer-readable medium may store instructions executable by a processor to: receive a message from a device using a first transmission resource; determine a time hopping pattern for retransmission of the message; determine at least a second transmission resource based at least in part on the first transmission resource and the time hopping pattern; and receive at least one retransmission of the message using the second transmission resource.

In certain examples, the instructions may be configured to cause the processor to implement one or more aspects of the fifth set of illustrative embodiments described above.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
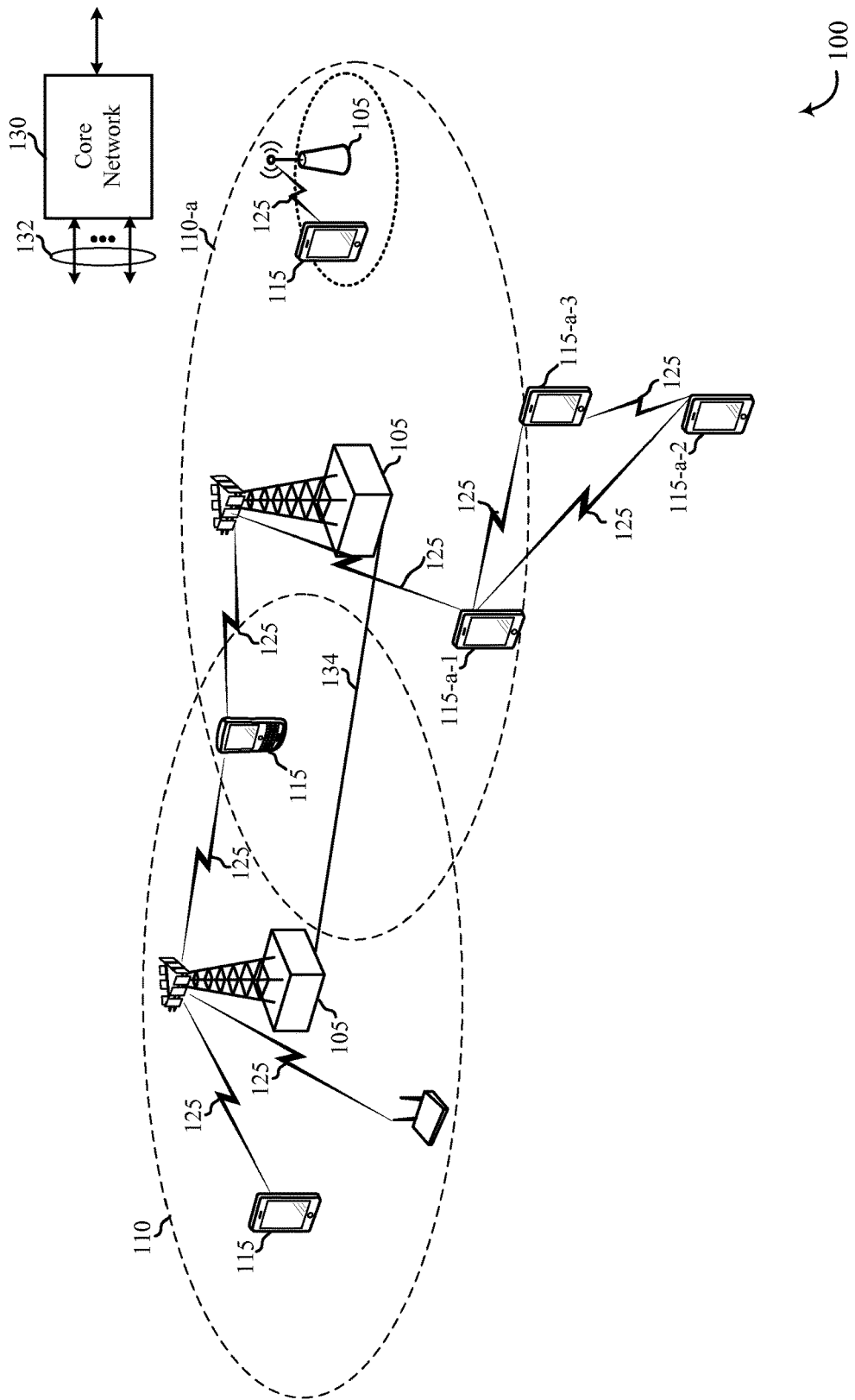
FIG. 1 illustrates an example of a wireless communications system in accordance with various embodiments.

Features generally relating to one or more improved systems, methods, and/or apparatuses for message transmissions and retransmissions using D2D devices are described. To provide enhanced reception and power savings in D2D communications, UEs may be provided with an initial message transmission. A time hopping pattern for one or more message retransmissions may be determined based at least in part on the initial message transmission. In certain examples, a D2D device may determine a time hopping pattern for one or more retransmissions based at least in part on a resource of the initial transmission and the time hopping pattern. In certain examples, messages may be retransmitted according to the time hopping pattern in order to enhance reception of messages at a receiving device. The messages may include, for example, a scheduling assignment (SA) for data transmission, or data transmissions from a transmitting device. Time hopping patterns may be determined, for example, based on times and/or frequencies of the initial transmission. In some examples, a base station may transmit a message to a transmitting device that indicates one or more time hopping patterns that are to be used for the transmissions.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1λ, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

FIG. 1 illustrates an example of a wireless communications system 100 in accordance with various embodiments. The system 100 includes base stations 105, communication devices, also known as a user equipment (UE) 115, and a core network 130. The base stations 105 may communicate with the UEs 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Wireless communication links 125 may be modulated according to various radio technologies. Each modulated signal may carry control information (e.g., reference signals, control channels, etc.), overhead information, data, etc. Wireless communication links 125 may also be established between UEs 115 in a configuration known as D2D communication.

The base stations 105 may wirelessly communicate with the UEs 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area. The system 100 may include base stations 105 of different types (e.g., macro, micro, and/or pico base stations). There may be overlapping coverage areas for different technologies.

The system 100 may be a Heterogeneous LTE/LTE-A network in which different types of base stations provide coverage for various geographical regions. For example, each base station 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell.

The core network 130 may communicate with the base stations 105 via a backhaul 132 (e.g., S1, etc.). The base stations 105 may also communicate with one another, e.g., directly or indirectly via backhaul links 134 (e.g., X2, etc.) and/or via backhaul links 132 (e.g., through core network 130). The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The UEs 115 are dispersed throughout the wireless communications system 100, and each UE may be stationary or mobile. A UE115 may communicate with other UEs 115 using D2D communications. One or more of a group of UEs (for example, a first UE 115-a-a-1) utilizing D2D communications may be within a coverage area 110-a of a cell. Other UEs (for example a second UE 115-a-2 and a third UE 115-a-3) in such a group may be outside the coverage area 110-a of the cell, or otherwise unable to receive transmissions from a base station 105. Groups of UEs 115-a communicating via D2D communications may utilize a one-to-many (1:M) system in which each UE 115-a transmits to every other UE 115-a in the group. In some cases, a base station 105 facilitates the scheduling of resources for D2D communications. In other cases, D2D communications are carried out independent of a base station 105. In some cases, UEs 115-a engaged in D2D communications may be located relatively closely. In other circumstances, the UEs 115-a may communicate with each other over long distances. As mentioned above, in some examples a transmitting UE may transmit a message, and a time hopping pattern for one or more subsequent transmissions may be determined based on the initial transmission, which may allow for enhanced reception of communications and/or power savings.

A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The wireless communication links 125 shown in system 100 may include uplink (UL) transmissions from a UE 115 to a base station 105, and/or downlink (DL) transmissions, from a base station 105 to a UE 115 over DL carriers. They may also represent D2D communication links. The downlink transmissions may also be called forward link transmissions while the uplink transmissions may also be called reverse link transmissions.

Figure 2:
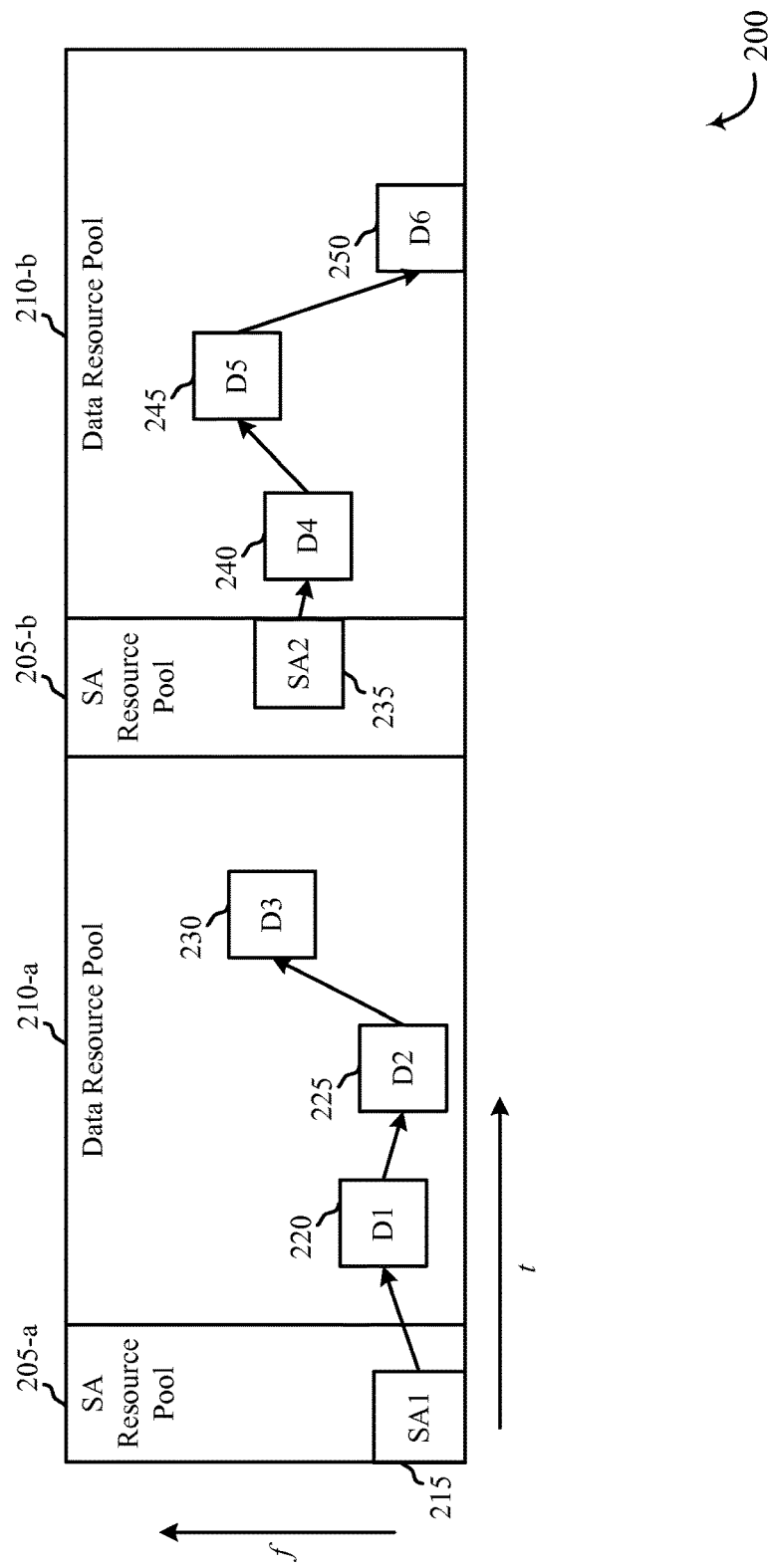
FIG. 2 illustrates an example of SA and data resource pools for transmissions of SAs and data in accordance with various embodiments.

FIG. 2 illustrates an example 200 of SA resource pools and data resource pools for transmissions of SAs and data, in accordance with various embodiments. Specifically, FIG. 2 illustrates a first SA resource pool 205-a and a first data resource pool 210-a, and a second SA resource pool 205-b and a second data resource pool 210-b. The resource pools 205 and 210 may be used to transmit messages 215 through 250, such as SAs and data, between UEs, such as UEs 115 in FIG. 1, in D2D communications, for example. The messages 215 through 250 may be transmitted, for example, in LTE subframes from a transmitting D2D UE to one or more receiving D2D UEs.

In some examples, a transmitting UE may transmit a first SA to one or more receiving UEs using resources SA1 215 from within SA resource pool 205-a. In some examples, a frequency resource used for the initial transmission, SA1 215 in the example of FIG. 2, may be associated with a time hopping pattern that is used for subsequent transmissions 220, 225, and 230. In some examples, the first SA 215 may indicate resources for the first data transmission 220, and a transmission resource of the first data transmission 220 may be associated with a time hopping pattern that is used for subsequent transmissions 225 and 230. For example, a frequency resource of the first data transmission 220 (or SA transmission 215) may be associated with the time hopping pattern that is used for subsequent transmissions 225 and 230. In other examples, the retransmission resources 225 and 230 may be determined based on one or more of the frequency resource of the initial data transmission 220 (or SA transmission 215), a target identification (ID) contained in the first SA transmission 215, or a D2D subframe number. In addition, different time hopping pattern IDs may be used to change a mean inter-arrival time between retransmissions. For example, a first time hopping pattern (determined based on resources of an initial transmission) may have 4 ms inter-arrival time between retransmissions 225 and 230, and a second time hopping pattern may have a 2 ms inter-arrival time between retransmissions 225 and 230.

Following the data resource pool 210-a, in this example, is a second SA resource pool 205-b, that may be used to transmit a second SA using resources SA2 235. Similarly as with the first SA, the second SA may identify resources for one or more data transmissions D4 240, D5 245, and D6 250 from within data resource pool 210-b that may be used to transmit data to a receiving UE. A time hopping pattern for retransmissions of data transmissions 240 through 250 may be determined, as discussed above, based on a resource used for the initial transmission of either the SA 235 or data transmission 240.

Figure 3A:
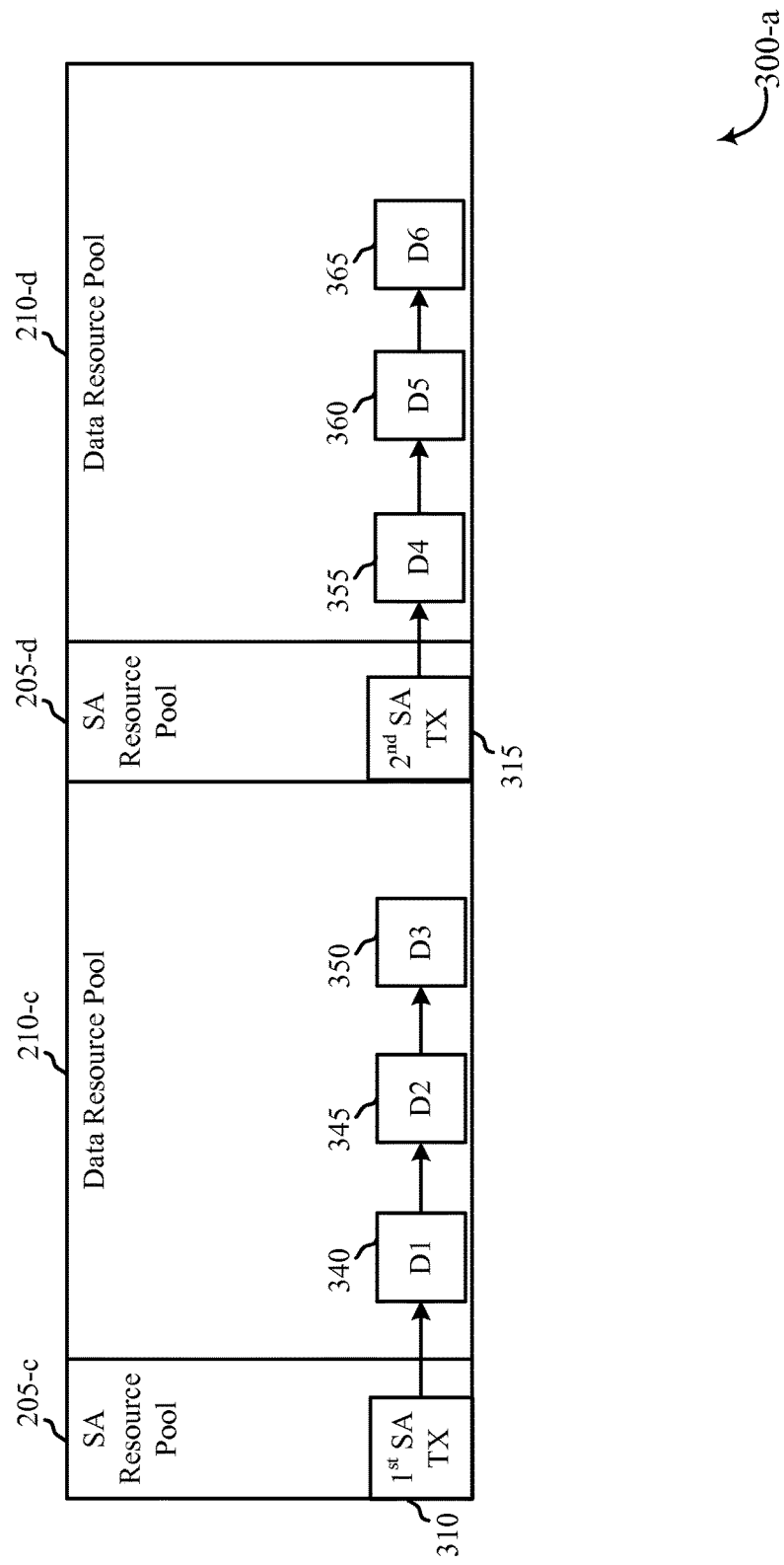
FIG. 3A illustrates an example of multiple data transmissions following an initial message transmission in accordance with various embodiments.

As mentioned above, a SA may include information indicating details for one or more data transmissions in a data resource pool. With reference now to FIG. 3A, example 300 of SA resource pools and data resource pools for transmissions of SAs and data, in accordance with various embodiments, is described. In this example, a first SA resource pool 205-c is followed by a first data resource pool 210-c, and a second SA resource pool 205-d is followed by a second data resource pool 210-d. SA resource pools 205 and data resource pools 210 may be examples of the SA and/or data resource pools of FIG. 2, and may be utilized, for example, in D2D communications between UEs, such as UEs 115 in FIG. 1. In this example, SA resource pools 205-c and 205-d are a 4 ms resource pools each followed by 160 ms data resource pools 210-c and 210-d, respectively.

In the example of FIG. 3A, a first SA is transmitted using first SA resources 310. The first SA resources 310 may include information related to a first data transmission 340 and/or subsequent data transmissions 345, 350. Similarly, a second SA may be transmitted using second SA resources 315. The second SA resources 315, as with the first SA resources 310, may include information related to second data transmission 355 and/or subsequent data transmissions 360, 365. In some examples, as mentioned above, a time hopping pattern may be mapped to a particular resource in the SA resource pool 205 that is used for the transmission of a SA. In other examples, as mentioned above, a time hopping pattern may be mapped to a particular resource in the data resource pool 210 that is used for the initial data transmission.

Figure 3B:
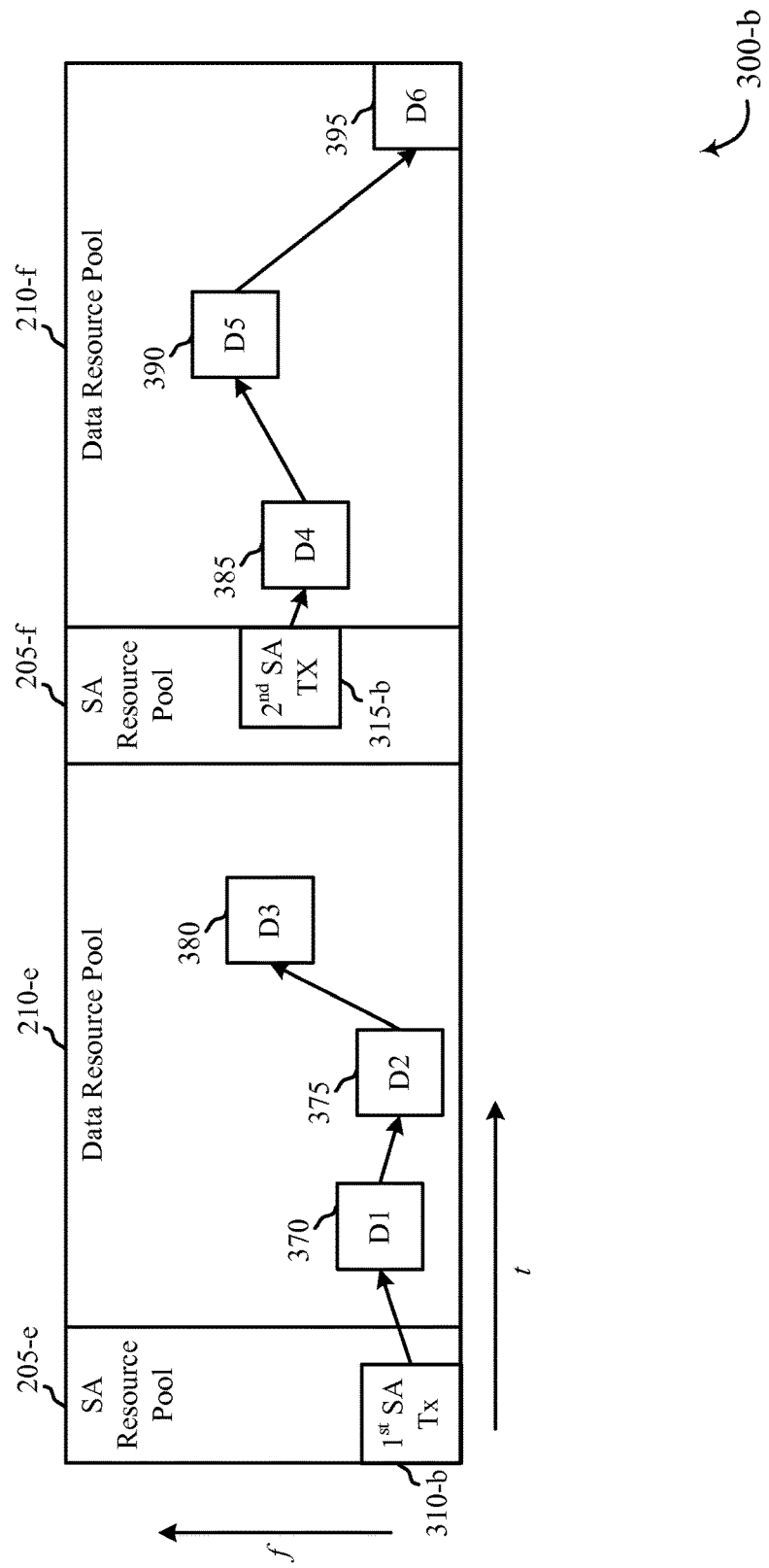
FIG. 3B illustrates an example of multiple data transmissions having time and frequency diversity following an initial message transmission in accordance with various embodiments.

Furthermore, according to certain examples, retransmissions may include a frequency hopping pattern for subsequent transmissions of data, in which a first data transmission may use first frequency resources, and subsequent data transmissions may use diverse frequency resources from the first data transmission and be transmitted according to a time hopper pattern. FIG. 3B illustrates an example 300-b of time and frequency hopping patterns for data transmissions in data resource pools, in accordance with various embodiments. In this example, SA resource pool 205-e is followed by a data resource pool 210-e, and a second SA resource pool 205-f is followed by a second data resource pool 210-f SA resource pools 205 and data resource pools 210 may be examples of the SA and/or data resource pools of FIGS. 2 and/or 3A, and may be utilized, for example, in D2D communications between UEs, such as UEs 115 in FIG. 1. In this example, three data transmissions 370, 375, 380 are transmitted in data resource pool 210-e following a SA transmission 310-b. Similarly, a second set of three data transmissions 385, 390, 395 are transmitted in data resource pool 210-f following second SA transmission 315-b.

In certain examples, for data transmissions 370, 375, and 380 the frequency hopping pattern, time hopping pattern, and/or number of data transmissions may be determined based on the resource in the SA resource pool 205-e used to transmit the first SA transmission 310-b. In other examples, the first SA transmission 310-b may indicate a resource for the first data transmission 370, and a frequency hopping pattern, time hopping pattern, and/or number of data retransmissions for transmissions 375 and 380 may be determined based on the resource of the first data transmission 370. Likewise, data transmissions 385, 390, and 395 may have time hopping, frequency hopping, and a number of transmissions based on the resource in the SA resource pool 205-f used to transmit the second SA transmission 315-b, or resources for retransmissions 390 and 395 may be determined based on the resource of the first data transmission 370. The receiving UE may then determine resources from the data resource pool 210-e and 210-f that are to be monitored for reception of the data transmissions and retransmissions. In other examples, the SA may include a target identification (ID) for the subsequent transmission of data, the subsequent transmission of data may be scrambled using the target ID. Such scrambling may provide interference mitigation for transmitted data, for example.

Thus, according to various examples, a transmitting UE may transmit a message to one or more devices using a first transmission resource, and a time hopping pattern for retransmission of the message may be determined. One or more subsequent transmission resource may be determined based at least in part on the first transmission resource and the time hopping pattern. As mentioned above, in some examples subsequent transmission resources may be mapped to a time hopping pattern that is determined based at least in part on a frequency of the first transmission resource. The time hopping pattern may identify, for example, one or more of the subsequent transmission resource(s) as a time and frequency diverse resource relative to the first transmission resource. In some examples, the time hopping pattern also may identify a number of retransmissions of the message.

The time hopping pattern identification may be provided to a transmitting UE in any of a number fashions. In some examples, the time hopping pattern may be defined in a standard for D2D communications. In other examples, an eNB, such as eNB 105 of FIG. 1, may inform a transmitting UE, and possibly a receiving UE, of the time hopping patterns to be used in D2D communications. Such eNB-based signaling may include, for example, downlink control information (DCI) signaling, RRC signaling, and/or system information block (SIB) signaling. In some examples, DCI signaling may be used, in which DCI format 0 is provided and may be reinterpreted when scrambled with D2D target ID. In addition, the number of retransmissions may be informed along with time hopping pattern ID, and may be implicit with the time hopping pattern ID, or may be a parameter independent of time hopping pattern ID. In other examples, the one or more subsequent transmissions may be determined based at least in part on a target identification included in the message. A D2D receiving UE may receive signaling of time hopping pattern IDs, and time hopping resources in a similar manner, and may monitor received communications based on the particular resources that are identified according to the identified time hopping pattern and/or frequency hopping pattern.

Figure 4:
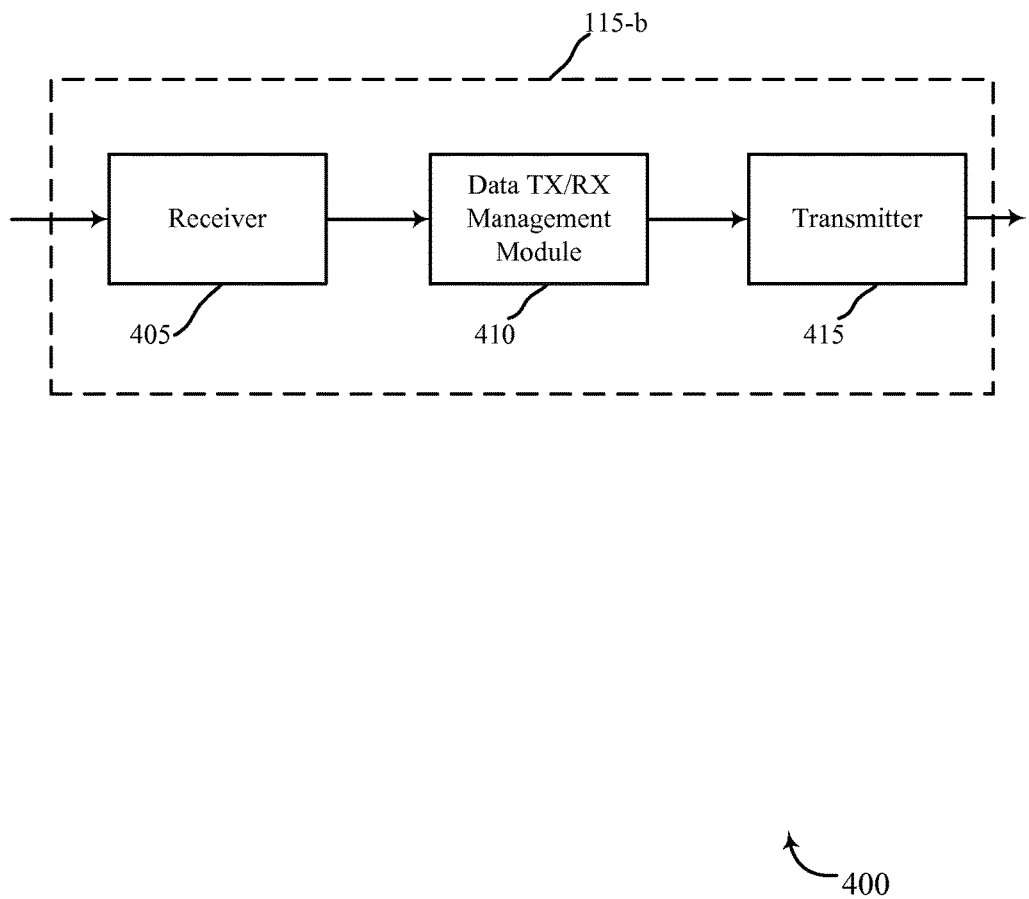
FIG. 4 shows a block diagram of a device that implements message retransmissions in accordance with various embodiments.

FIG. 4 shows a block diagram 400 of a UE 115-b for transmitting and/or receiving SA and data transmissions in accordance with various embodiments. The UE 115-b may be an example of one or more aspects of a UE 115 described with reference to FIG. 1. The UE 115-b may include a receiver 405, a data transmission/reception management module 410, and/or a transmitter 415. The UE 115-b may also include a processor. Each of these components may be in communication with each other.

The components of the UE 115-b may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver 405 may receive information such as packets, user data, and/or control information associated with various information channels (e.g., control channels, data channels, etc.). For example, the receiver 405 may receive a message from a base station indicating one or more resources to be used for SA and/or data transmissions, and may receive a time hopping pattern ID for retransmissions of messages. The message from the base station may be received, for example, in a SIB, in DCI, and/or in RRC signaling, for example. Information may be passed on to the data transmission/reception module 410, and to other components of the UE 115-b.

The data transmission/reception module 410 may determine scheduling assignments for one or more data transmissions or retransmissions based at least in part on a time hopping pattern for an initial transmission to a receiving device. If UE 115-*b* is a D2D transmitting device, for example, the timing hopping pattern may be determined for message retransmissions based on an initial resource for an initial transmission. If UE 115-*b* is a D2D receiving device, the time hopping pattern may be determined based on a resource of an initial received message, such as a received SA or a received data transmissions, with subsequent data retransmissions received according to the determined time hopping pattern.

The transmitter 415 may transmit the one or more signals received from other components of the UE 115-*b*. For example, the transmitter 415 may transmit SA and data transmissions to one or more receiving UEs in D2D transmissions. In some embodiments, the transmitter 415 may be collocated with the receiver 405 in a transceiver module. The transmitter 415 may include a single antenna, or it may include a plurality of antennas.

Figure 5:
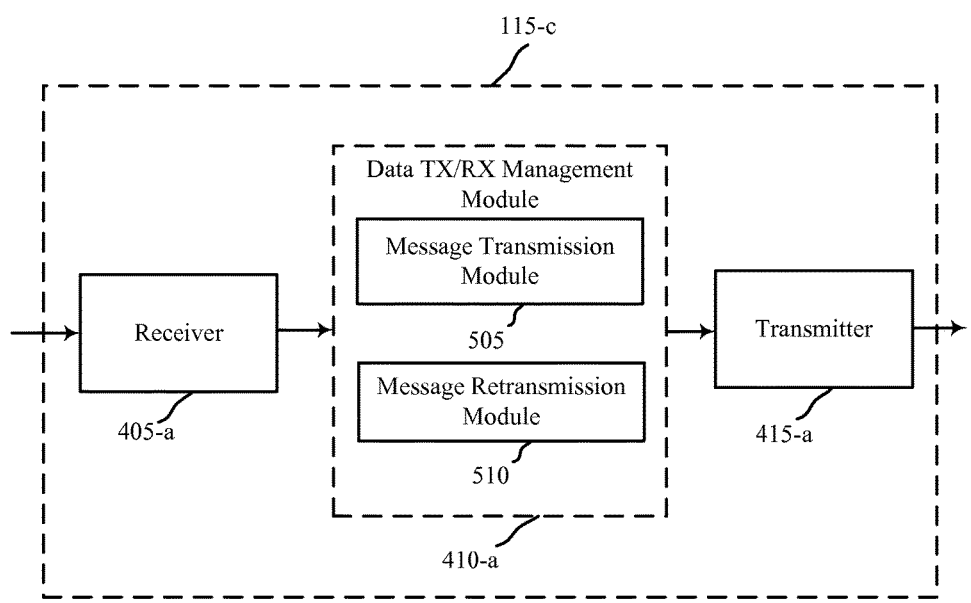
FIG. 5 shows a block diagram of a device for message transmissions and retransmissions in accordance with various embodiments.

FIG. 5 shows a block diagram 500 of a UE 115-*c* for transmitting and/or receiving SA and data transmissions in accordance with various embodiments. The UE 115-*c* may be an example of one or more aspects of a UE 115 described with reference to FIGS. 1 and/or 4. The UE 115-*c* may include a receiver 405-*a*, a data transmission/reception module 410-*a*, and/or a transmitter 415-*a*. The UE 115-*c* may also include a processor. Each of these components may be in communication with each other. The data transmission/reception module 410-*a* may also include a message transmission module 505 and a data retransmission module 510.

The components of the UE 115-*c* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver 405-*a* may receive information which may be passed on to the data transmission/reception module 410-*a*, and to other components of the UE 115-*c* as described above with reference to FIG. 4. The data transmission/reception module 410-*a* may be configured to perform the operations described above with reference to FIG. 4. The transmitter 415-*a* may transmit the one or more signals received from other components of the UE 115-*c*. For example, in cases where UE 115-*c* is a D2D transmitting device, it may transmit SA and data transmissions using D2D communications to one or more receiving UEs according to time hopping patterns such as discussed above.

The message transmission module 505 may be configured to determine SAs and resources from a SA resource pool for use in SA transmissions, and resources from a data resource pool for data transmissions and retransmissions, in a similar manner as discussed above with respect to FIGS. 2, 3A, and/or 3B. The message retransmission module 510 may be configured to determine retransmission patterns, such as time hopping patterns and time/frequency hopping patterns, in a similar manner as discussed above with respect to FIGS. 2, 3A and/or 3B.

Figure 6:
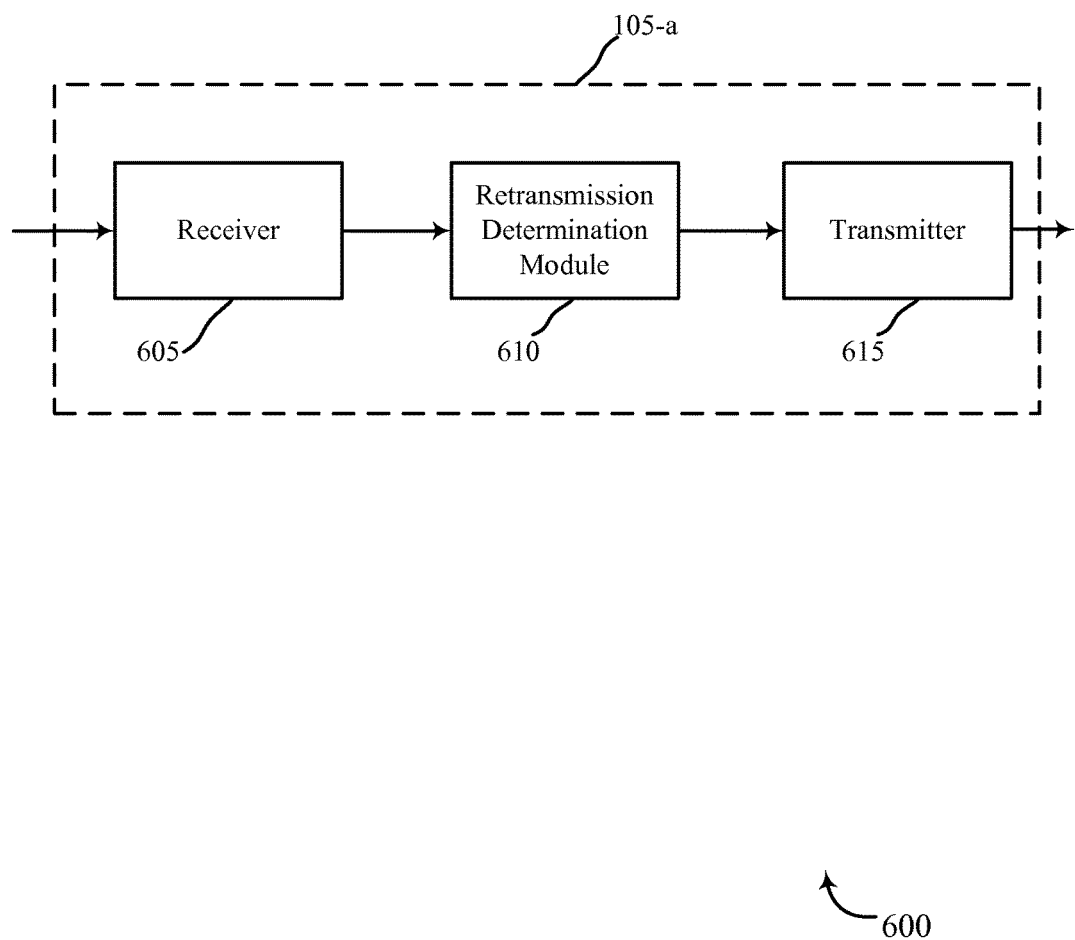
FIG. 6 shows a block diagram of a device for providing one or more time hopping patterns in accordance with various embodiments.

FIG. 6 shows a block diagram 600 of a base station 105-*a* for configuring transmissions and retransmission patterns of one or more D2D devices in accordance with various embodiments. The base station 105-*a* may be an example of one or more aspects of a base station 105 described with reference to FIG. 1. The base station 105-*a* may include a receiver 605, a retransmission determination module 610, and/or a transmitter 615. The base station 105-*a* may also include a processor. Each of these components may be in communication with each other. The retransmission determination module 610 may determine one or more time hopping pattern IDs for use by D2D devices, and may signal the time hopping pattern ID via one or more signaling mechanisms, such as via DCI, RRC messaging, and/or SIB broadcasts, for example.

The components of the base station 105-*a* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 7:
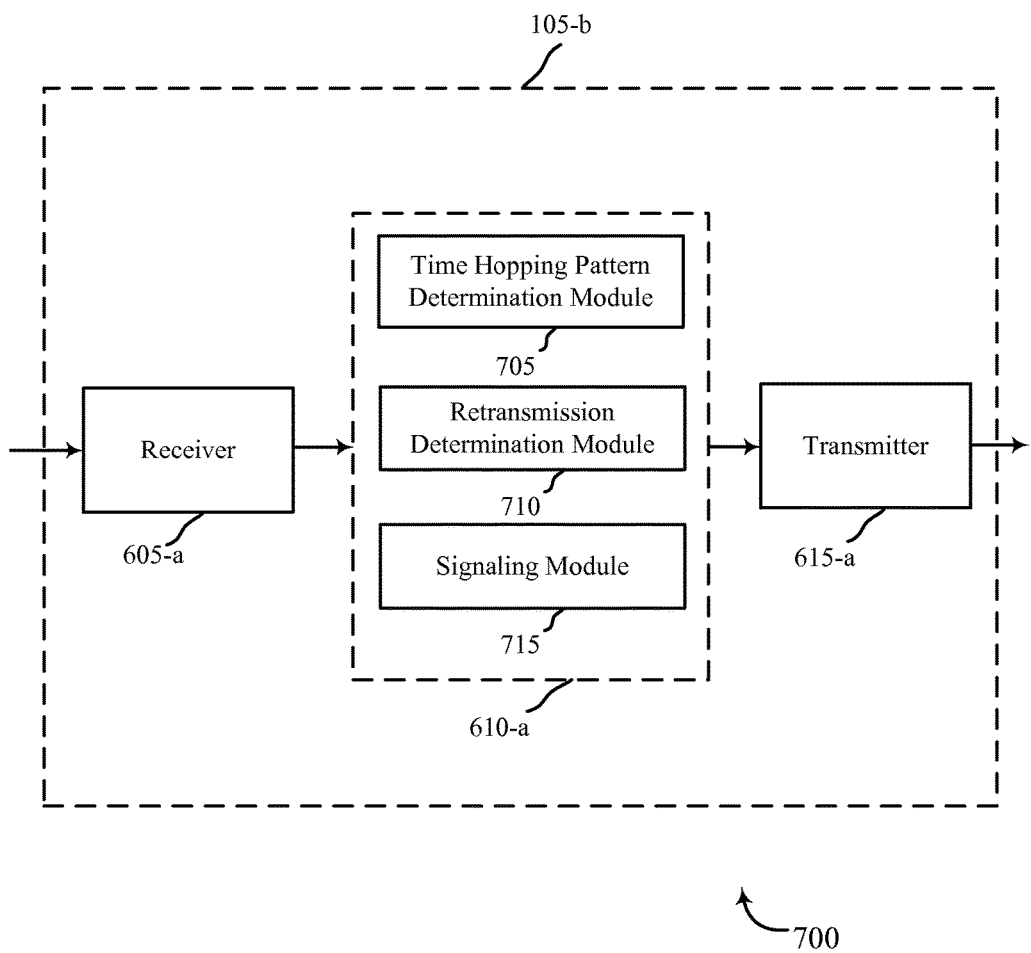
FIG. 7 shows a block diagram of a device for providing one or more time hopping patterns and number of retransmissions in accordance with various embodiments.

FIG. 7 shows a block diagram 700 of a base station 105-*b* for configuring transmissions and retransmission patterns of one or more D2D devices in accordance with various embodiments. The base station 105-*b* may be an example of one or more aspects of a base station 105 described with reference to FIGS. 1 and/or 6. The base station 105-*b* may include a receiver 605-*a*, a retransmission determination module 610-*a*, and/or a transmitter 615-*a*. The base station 105-*b* may also include a processor. Each of these components may be in communication with each other. The retransmission determination module 610-*a* may also include a time hopping pattern determination module 705, a retransmission determination module 710, and a signaling module 720.

The components of the base station 105-*b* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver 605-*a* may receive information which may be passed on to the retransmission determination module 610-*a*, and to other components of the base station 105-*b* as described above with reference to FIG. 6. The retransmission determination module 610-*a* may be configured to perform the operations described above with reference to FIG. 6. The transmitter 615-*a* may transmit the one or more signals received from other components of the base station 105-*b*. For example the base station 105-*b* may transmit time hopping pattern IDs and related mappings to one or more D2D devices.

The time hopping pattern determination module 705 may be configured to determine a time hopping pattern for data transmissions and/or data retransmissions, in a similar manner as discussed above with respect to FIGS. 2, 3A, 3B, 4, 5, and/or 6, for example. The retransmission determination module 710 may be configured to determine a number of retransmissions for D2D messages that are transmitted by a D2D transmitting device, in a similar manner as discussed above with respect to FIGS. 2, 3A, 3B, 4, 5, and/or 6, for example. The signaling module 715 may be configured to signal time hopping pattern IDs and/or number of retransmissions via one or more signaling mechanisms, such as via DCI, RRC messaging, and/or SIB broadcasts, for example.

Figure 8:
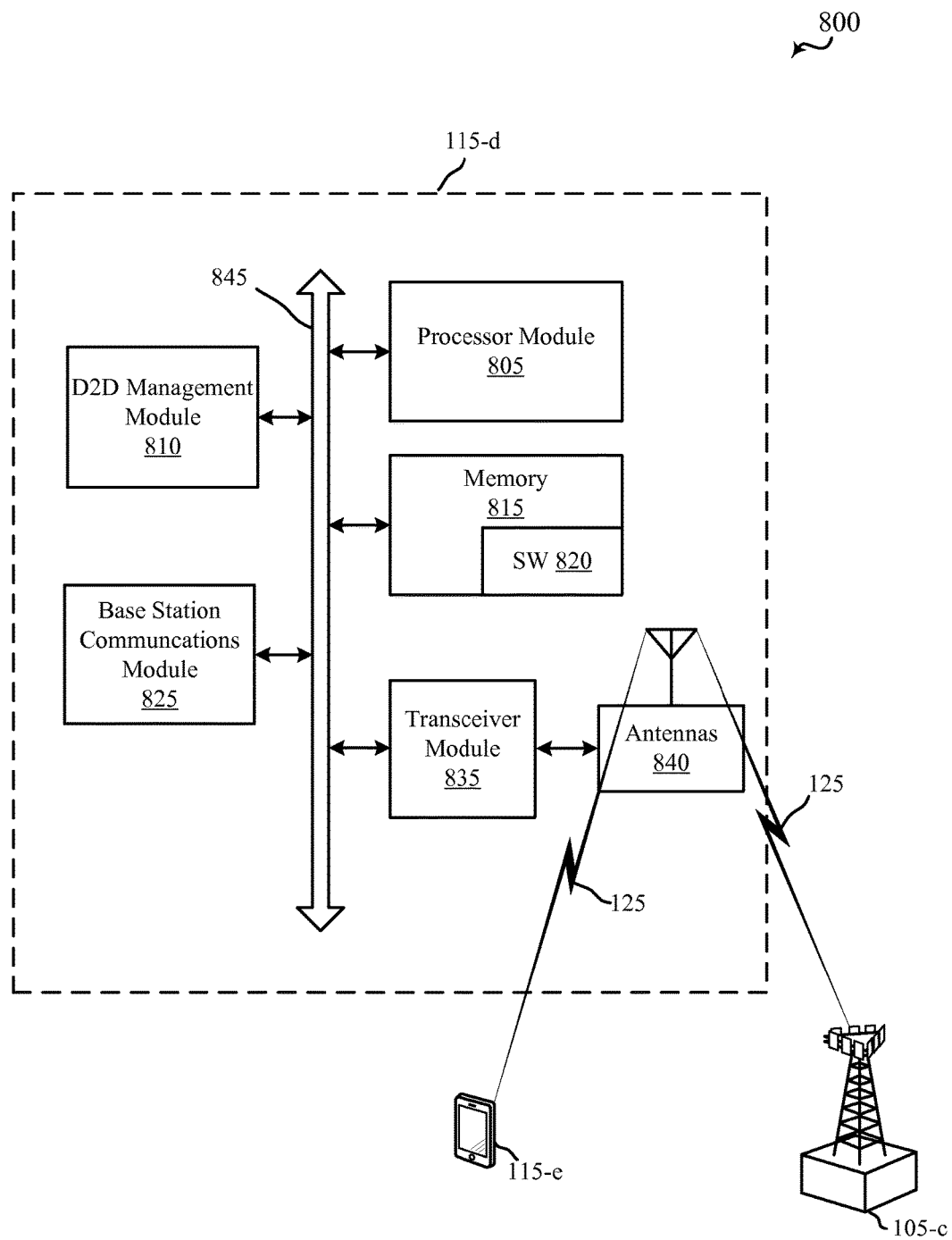
FIG. 8 illustrates a block diagram of a UE in a system for implementing message transmission and retransmissions in accordance with various embodiments.

FIG. 8 shows a diagram of a system 800 for D2D communications in accordance with various embodiments. System 800 may include a UE 115-*d*, which may be an example of a UE 115 with reference to FIGS. 1, 4 and/or 5. The UE 115-*d* may generally include components for bi-directional voice and data communications including components for transmitting communications and components for receiving communications.

The UE 115-*d* may include antenna(s) 840, a transceiver module 835, a processor module 805, and memory 815 (including software (SW)) 820, which each may communicate, directly or indirectly, with each other (e.g., via one or more buses 845). The transceiver module 835 may be configured to communicate bi-directionally, via the antenna(s) 840 and/or one or more wired or wireless links, with one or more networks, as described above. For example, the transceiver module 835 may be configured to communicate bi-directionally with a base station 105-*c* and a UE 115-*e*. UE 115-*d* and UE 115-*e* may be transmitting and receiving D2D devices, for example. The transceiver module 835 may include a modem configured to modulate the packets and provide the modulated packets to the antenna(s) 840 for transmission, and to demodulate packets received from the antenna(s) 840. While the UE 115-*d* may include a single antenna 840, the UE 115-*d* may also have multiple antennas 840 capable of concurrently transmitting and/or receiving multiple wireless transmissions. The transceiver module 835 may also be capable of concurrently communicating with one or more base stations 105.

The memory 815 may include random access memory (RAM) and read-only memory (ROM). The memory 815 may store computer-readable, computer-executable software/firmware code 820 containing instructions that are configured to, when executed, cause the processor module 805 to perform various functions described herein (e.g., call processing, database management, processing of carrier mode indicators, reporting CSI, etc.). Alternatively, the software/firmware code 820 may not be directly executable by the processor module 805 but be configured to cause a computer (e.g., when compiled and executed) to perform functions described herein. The processor module 805 may include an intelligent hardware device, e.g., a central processing unit (CPU), a microcontroller, an application-specific integrated circuit (ASIC), etc. may include random access memory (RAM) and read-only memory (ROM).

The memory 815 may store computer-readable, computer-executable software/firmware code 820 containing instructions that are configured to, when executed, cause the processor module 805 to perform various functions described herein (e.g., time hopping pattern determination, transmitting D2D communications, receiving D2D communications, etc.). Alternatively, the software/firmware code 820 may not be directly executable by the processor module 805 but be configured to cause a computer (e.g., when compiled and executed) to perform functions described herein. The processor module 805 may include an intelligent hardware device, e.g., a central processing unit (CPU), a microcontroller, an application-specific integrated circuit (ASIC), etc. Base station communications module 825 may perform operations related to communications with one or more base stations.

The D2D management module 810 may be configured to determine time hopping patterns for message transmissions and retransmissions, and perform operations related to D2D communications as discussed above with respect to FIGS. 1, 2, 3A, 3B, 4, and/or 5. If UE 115-*d* is a D2D transmitting device, for example, the time hopping pattern may be determined for receiving UEs, and resources from a SA resource pool and/or data resource pool may be determined for message transmissions, similarly as discussed above. If UE 115-*d* is a D2D receiving device, the D2D management module 810 may monitor SA or data resources for an initial transmission from a D2D transmitting device and determine resources used for an initial received message. Based on the resources used for the transmission, the D2D management module 810 may determine a time hopping pattern and resources that are to be used for data transmission or retransmissions. In some examples, the D2D management module 810 may determine both a time hopping pattern and frequency hopping pattern, similarly as discussed above.

Figure 9:
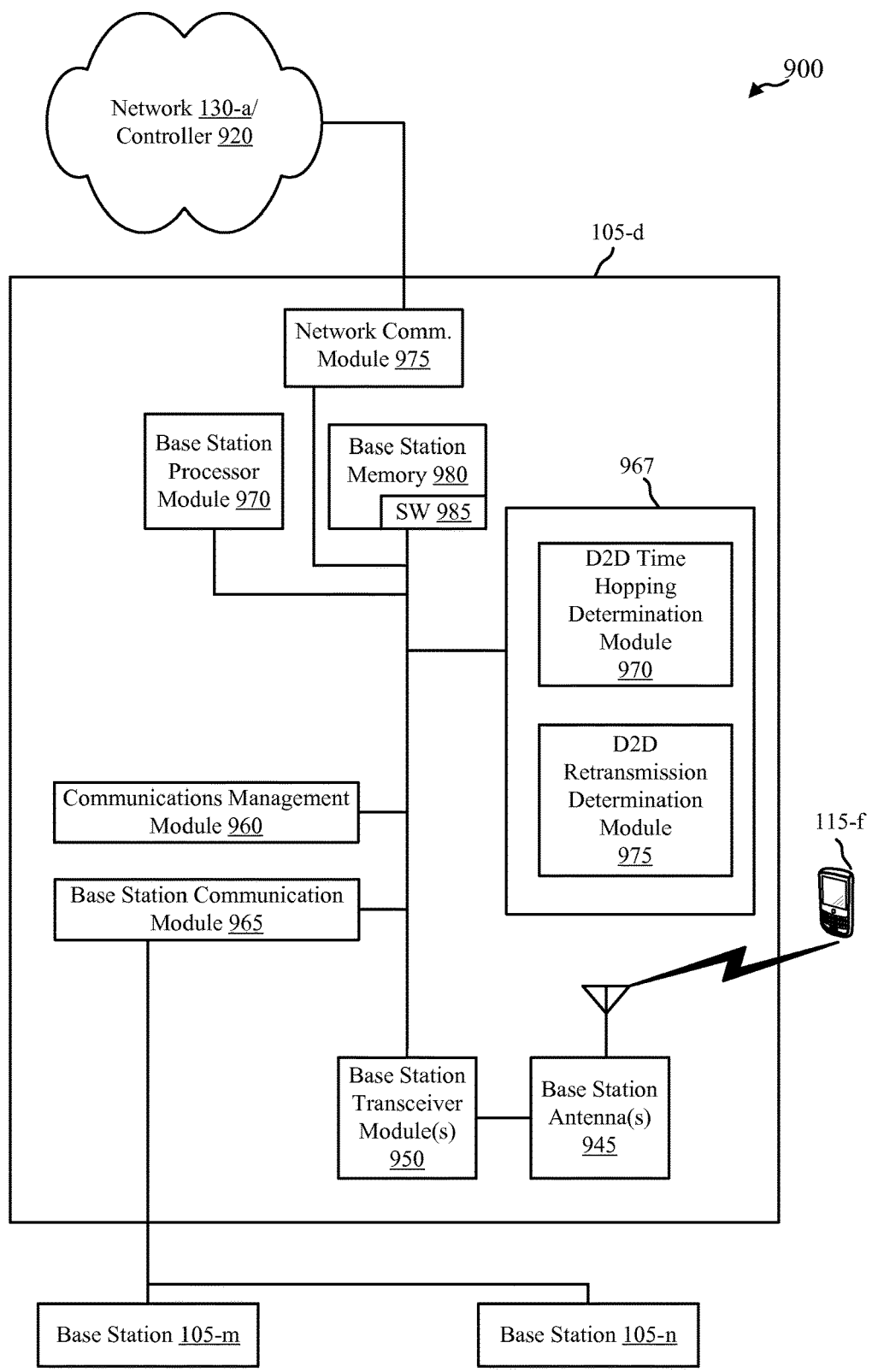
FIG. 9 illustrates a block diagram of a base station in a system for implementing message transmissions and retransmissions in accordance with various embodiments.

FIG. 9 shows a block diagram of a communications system 900 that may be configured for use in receiving and transmitting D2D communications, in accordance with various aspects of the present disclosure. The system 900 may be an example of aspects of the systems 100, and/or 800 depicted in FIGS. 1 and/or 8, respectively. System 900 may include a base station 105-*d* in communication with a UE 115-*f*. The base station 105-*d* may include base station antenna(s) 945, a base station transceiver module 950, base station memory 980, and a base station processor module 970, which each may be in communication, directly or indirectly, with each other (e.g., over one or more buses). The base station transceiver module 950 may be configured to communicate bi-directionally, via the base station antenna(s) 945, with a UE 115-*f*, which may be an example of a UE 115 of FIGS. 1, 4, 5 and/or 8. The base station transceiver module 950 (and/or other components of the base station 105-*d*) may also be configured to communicate bi-directionally with one or more networks. In some cases, the base station 105-*d* may communicate with the core network 130-*a* and/or controller 920 through network communications module 975. Base station 105-*d* may be an example of the base stations 105 of FIGS. 1, 6, 7 and/or 8. Controller 920 may be integrated into base station 105-*d* in some cases, such as with an eNodeB base station.

Base station 105-*d* may also communicate with other base stations 105, such as base station 105-*m* and base station 105-*n*. Each of the base stations 105 may communicate with the user device 115-*g* using different wireless communications technologies, such as different Radio Access Technologies. In some cases, base station 105-*d* may communicate with other base stations such as 105-*m* and/or 105-*n* utilizing base station communication module 965. In some embodiments, base station communication module 965 may provide an X2 interface within an LTE wireless communication technology to provide communication between some of the base stations 105. In some embodiments, base station 105-*c* may communicate with other base stations through controller 920 and/or core network 130-a.

The base station memory 980 may include random access memory (RAM) and read-only memory (ROM). The base station memory 980 may also store computer-readable, computer-executable software code 985 containing instructions that are configured to, when executed, cause the base station processor module 970 to perform various functions described herein (e.g., receiving and transmitting D2D communications, and providing resource grants, timing pattern information, etc.). Alternatively, the software code 985 may not be directly executable by the base station processor module 970 but be configured to cause the computer, e.g., when compiled and executed, to perform functions described herein. The base station processor module 970 may include an intelligent hardware device, e.g., a central processing unit (CPU), a microcontroller, an application-specific integrated circuit (ASIC), etc.

The base station transceiver module 950 may include a modem configured to modulate the packets and provide the modulated packets to the base station antenna(s) 945 for transmission, and to demodulate packets received from the base station antenna(s) 945. While some examples of the base station 105-d may include a single base station antenna 945, the base station 105-d may include multiple base station antennas 945 for multiple links which may support carrier aggregation. For example, one or more links may be used to support macro communications with the user device 115-f.

According to the architecture of FIG. 9, the base station 105-d may further include a communications management module 960. The communications management module 960 may manage communications with other base stations 105. As an example, the communications management module 960 may facilitate the transmittal of D2D information, such as timing patterns, etc., as discussed above. By way of example, the communications management module 960 may be a component of the base station 105-d in communication with some or all of the other components of the base station 105-d via a bus. Alternatively, functionality of the communications management module 960 may be implemented as a component of the base station transceiver module 950, as a computer program product, and/or as one or more controller elements of the base station processor module 970.

The components for base station 105-d may be configured to implement aspects discussed above with respect to FIGS. 2, 3A, 3B, 4, 5, 6, 7, and/or 8, which are not be repeated here for the sake of brevity. For example, the base station 105-d may include a base station D2D module 967. Base station D2D module 967 may include a D2D time hopping determination module 970 and D2D retransmission determination module 975, which may be configured to perform or control some or all of the base station related features or functions described with reference to FIGS. 1, 2, 3A, 3B, 4, 5, 6, 7 and/or 8. The base station D2D module 967, or portions of it, may include a processor, or some or all of the functions of the base station D2D module 967 may be performed by the base station processor module 970 or in connection with the base station processor module 970. Additionally, the base station D2D module 967, or portions of it, may include a memory, or some or all of the functions of the base station D2D module 967 may use the base station memory 980 or be used in connection with the base station memory 980.

Figure 10:
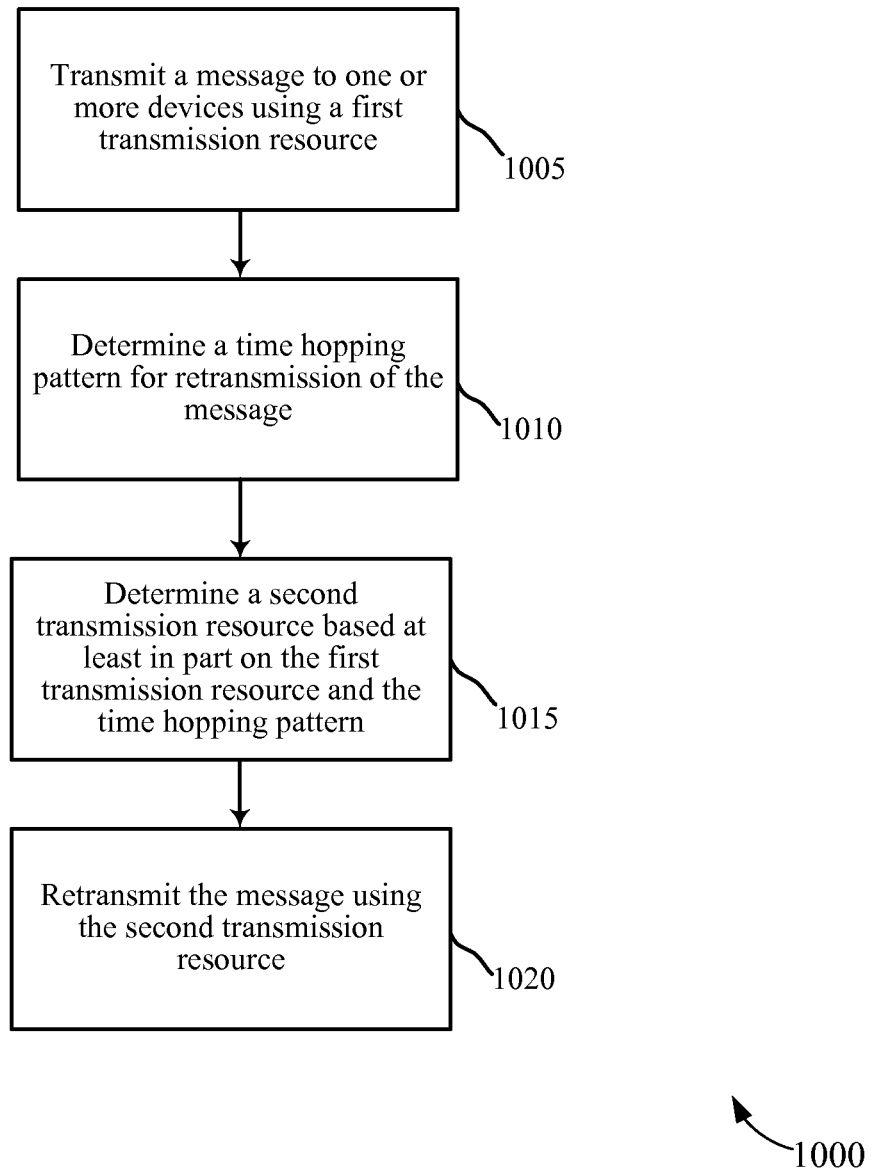
FIG. 10 shows a flowchart illustrating a method for message transmissions and retransmissions in accordance with various embodiments.

FIG. 10 shows a flowchart 1000 illustrating a method for D2D message transmission and retransmissions in accordance with various embodiments. The functions of flowchart 1000 may be implemented by a transmitting device, such as a UE 115 or its components as described with reference to FIGS. 1, 4, 5, 8 and/or 9. In some examples, a device, such as one of the UEs 115, may execute one or more sets of codes to control the functional elements of the device to perform the functions described below.

At block 1005, a message is transmitted to one or more devices using a first transmission resource. For example, a transmitting UE may transmit a SA in a broadcast D2D transmission to one or more receiving UEs using a first transmission resource. In other examples, such an SA may include a data resource for transmission of a data message, and the resource for the data message transmission may be the first transmission resource. At block 1010, a time hopping pattern for retransmission of the message is determined. The time hopping pattern may be a time-based repeating pattern for a number or retransmissions (e.g., three retransmissions each 4 ms following the immediate prior transmission). Determining may also include determining a frequency hopping pattern, in which one or more retransmissions use different frequency resources. Such retransmissions may enhance the likelihood of successful reception of the SA at the receiving device, for example. At block 1015, a second transmission resource is determined based at least in part on the first transmission resource and the time hopping pattern. At block 1020, the message is retransmitted using the second transmission resource.

It should be noted that the method of flowchart 1000 is just one implementation and that the operations of the method, and the steps may be rearranged or otherwise modified such that other implementations are possible.

Figure 11:
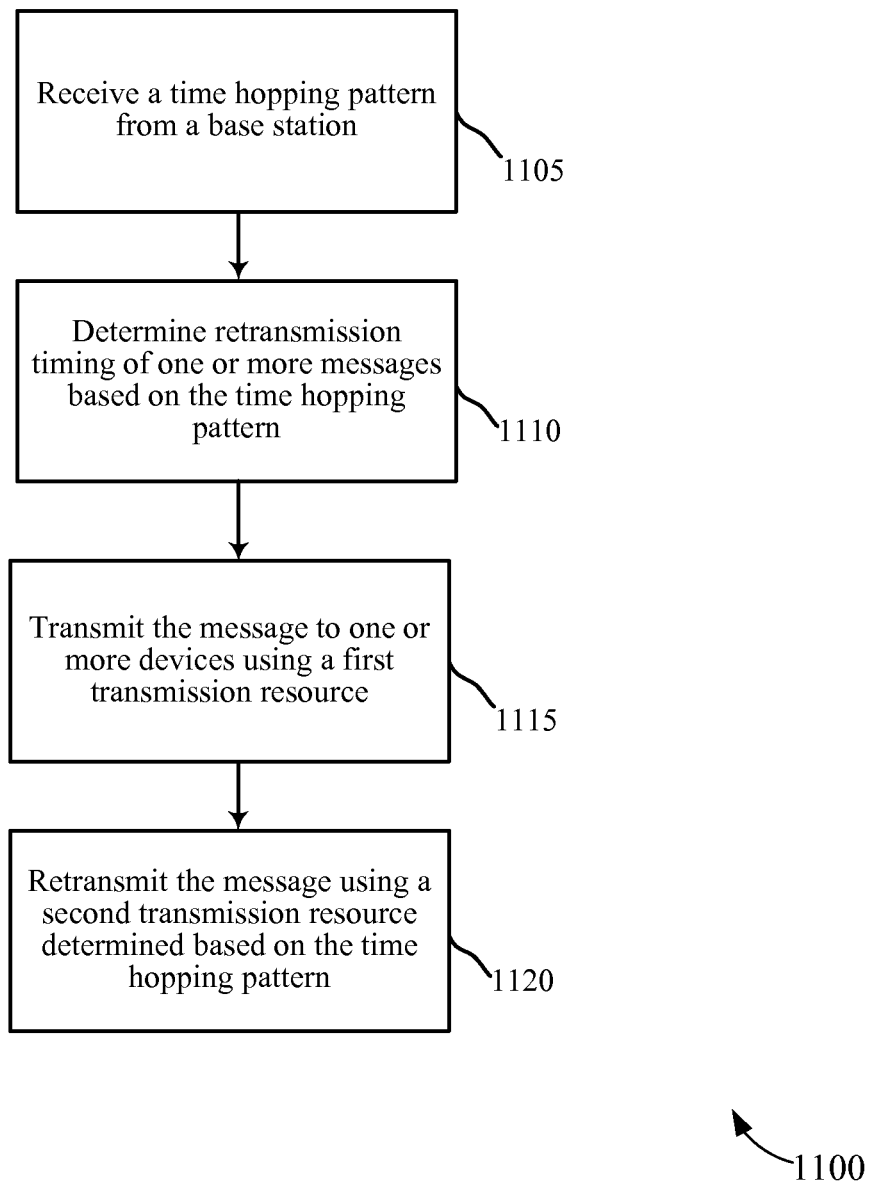
FIG. 11 shows another flowchart illustrating a method for message transmissions and retransmissions in accordance with various embodiments.

FIG. 11 shows a flowchart 1100 illustrating a method for D2D communication in accordance with various embodiments. The functions of flowchart 1100 may be implemented by a transmitting device, such as a UE 115 or its components as described with reference to FIGS. 1, 2, 3A, 3B, 4, 5, 8 and/or 9. In some examples, a device, such as one of the UEs 115, may execute one or more sets of codes to control the functional elements of the device to perform the functions described below.

At block 1105, a time hopping pattern is received from a base station. At block 1110, retransmission timing is determined for one or more messages based on the time hopping pattern. At block 1115, the message is transmitted to one or more devices using a first transmission resource. At block 1120, the message is retransmitted using a second transmission resource determined based on the time hopping pattern. Thus, different time hopping patterns may be associated with different resource blocks of an initial message transmission. Such patterns may be received, for example, in a SIB, in DCI transmissions, or in RRC messages. In some examples, the time hopping pattern may be defined in a standard. Such retransmissions may enhance the likelihood of successful reception of the SA at the receiving device.

It should be noted that the method of flowchart 1100 is just one implementation and that the operations of the method, and the steps may be rearranged or otherwise modified such that other implementations are possible.

Figure 12:
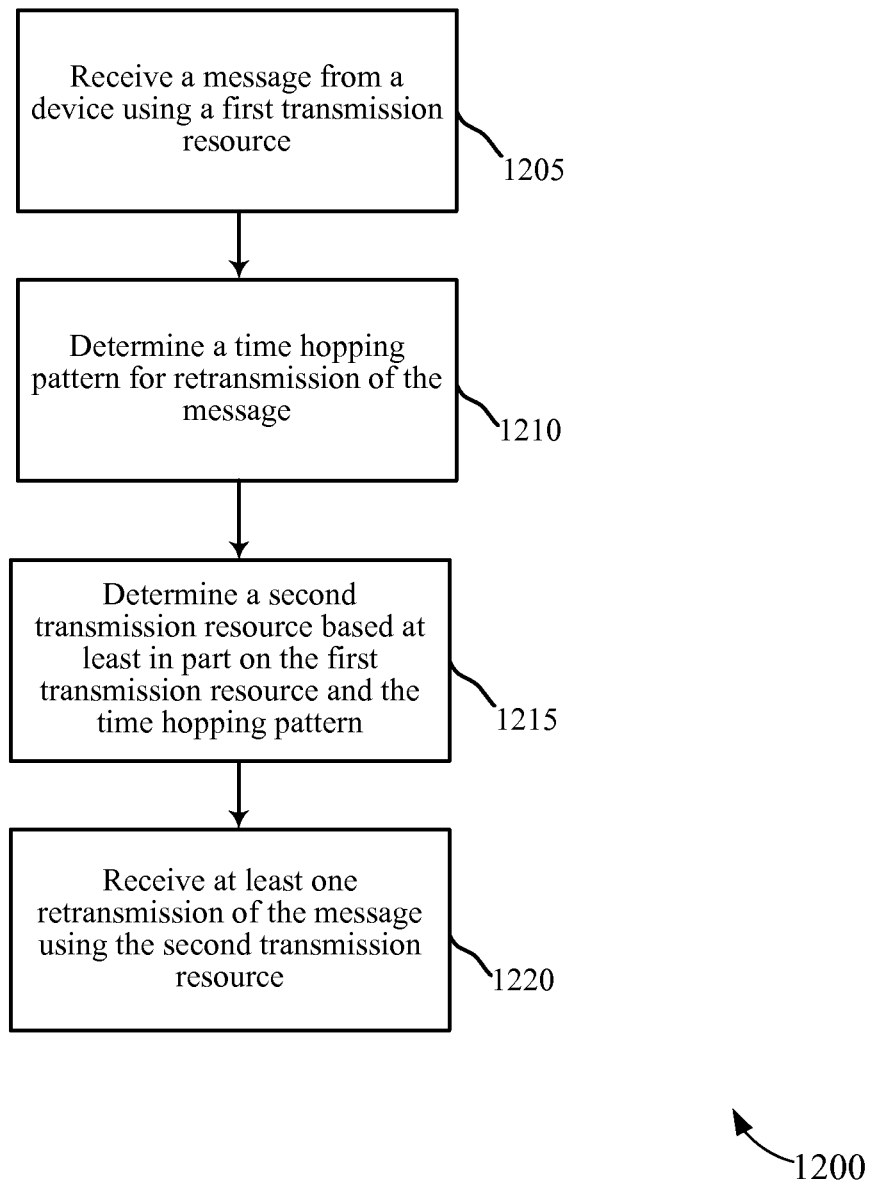
FIG. 12 shows another flowchart illustrating a method for message transmissions and retransmissions in accordance with various embodiments.

FIG. 12 shows a flowchart 1200 illustrating a method for D2D communications in accordance with various embodiments. The functions of flowchart 1200 may be implemented by a receiving device, such as a UE 115 or its components as described with reference to FIGS. 1, 4, 5, 8 and/or 9. In some examples, a device, such as one of the UEs 115, may execute one or more sets of codes to control the functional elements of the device to perform the functions described below.

At block 1205, a message is received from a device using a first transmission resource. At block 1210, a time hopping pattern is determined for retransmission of the message. The time hopping pattern may be determined based on a mapping between time hopping patterns and the first transmission resource, for example. At block 1215, a second transmission resource is determined based at least in part on the first transmission resource and the time hopping pattern. At block 1220, at least one retransmission of the message is received using the second transmission resource.

It should be noted that the method of flowchart 1200 is just one implementation and that the operations of the method, and the steps may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communications, comprising:
   receiving downlink control information (DCI) and a radio resource control (RRC) configuration from a base station, the DCI signaling a first time hopping pattern indication from a plurality of time hopping pattern indications associated with different time hopping patterns that have different mean inter-arrival times between retransmissions;
   transmitting, using a first time and frequency resource, a scheduling assignment for an initial transmission of a message and a retransmission of the message;
   transmitting the initial transmission of the message to one or more devices using a second time and frequency resource based at least in part on the scheduling assignment, wherein the message is transmitted in a device-to-device (D2D) transmission;
   determining a time hopping pattern for the retransmission of the message corresponding to a second time hopping pattern indication from the plurality of time hopping pattern indications associated with the RRC configuration, the second time hopping pattern indication identifying a time hopping pattern associated with a mean inter-arrival time between retransmissions different from a mean inter-arrival time between retransmissions of the first time hopping pattern indication;
determining a third time and frequency resource based at least in part on a frequency of the second time and frequency resource and the time hopping pattern; and
transmitting the retransmission of the message using the third time and frequency resource.

2. The method of claim 1, wherein the third time and frequency resource is further determined based at least in part on a target identification included in the scheduling assignment.

3. The method of claim 1, wherein the third time and frequency resource is further determined based at least in part on a subframe number of the second time and frequency resource.

4. The method of claim 1, wherein the time hopping pattern identifies at least the third time and frequency resource as a time and frequency diverse resource relative to the second time and frequency resource.

5. The method of claim 1, wherein the second time hopping pattern indication identifies a number of retransmissions of the message different from a number of retransmissions identified by the first time hopping pattern indication, and wherein the determining at least the third time and frequency resource comprises determining a number of time and frequency resources corresponding to the number of retransmissions identified by the second time hopping pattern indication.

6. The method of claim 1, further comprising:
performing a descramble operation using the DCI to obtain a D2D identification, wherein the DCI is scrambled with the D2D identification.

7. The method of claim 1, wherein the scheduling assignment indicates the time hopping pattern for one or more subsequent transmissions of data.

8. The method of claim 1, wherein the determining the time hopping pattern for the retransmission of the message comprises determining the time hopping pattern for the retransmission of the message corresponding to the second time hopping pattern indication based at least in part on that transmissions are not receivable from the base station at a time of the transmitting the scheduling assignment.

9. An apparatus of wireless communications, comprising a circuit configured to:
receive downlink control information (DCI) and a radio resource control (RRC) configuration from a base station, the DCI signaling a first time hopping pattern indication from a plurality of time hopping pattern indications associated with different time hopping patterns that have different mean inter-arrival times between retransmissions;
transmit, using a first time and frequency resource, a scheduling assignment for an initial transmission of a message and a retransmission of the message;
transmit the initial transmission of the message to one or more devices using a second time and frequency resource based at least in part on the scheduling assignment, wherein the message is transmitted in a device-to-device (D2D) transmission;
determine a time hopping pattern for the retransmission of the message corresponding to a second time hopping pattern indication from the plurality of time hopping pattern indications associated with the RRC configuration, the second time hopping pattern indication identifying a time hopping pattern associated with a mean inter-arrival time between retransmissions different from a mean inter-arrival time between retransmissions of the first time hopping pattern indication;
determine a third time and frequency resource based at least in part on a frequency of the second time and frequency resource and the time hopping pattern; and
transmit the retransmission of the message using the third time and frequency resource.

10. The apparatus of claim 9, wherein the third time and frequency resource is further determined based at least in part on a target identification included in the scheduling assignment.

11. The apparatus of claim 9, wherein the time hopping pattern identifies at least the third time and frequency resource as a time and frequency diverse resource relative to the second time and frequency resource.

12. The apparatus of claim 9, wherein the second time hopping pattern indication identifies a number of retransmissions of the message different from a number of retransmissions identified by the first time hopping pattern indication, and wherein determining at least the third time and frequency resource comprises determining a number of time and frequency resources corresponding to the number of retransmissions identified by the second time hopping pattern indication.

13. The apparatus of claim 9, wherein the DCI is scrambled with a D2D identification, and the circuit is further configured to:
perform a descramble operation using the DCI to obtain the D2D identification.

14. An apparatus of wireless communications, comprising:
a processor;
memory in electronic communication with the processor; and
instructions stored in the memory, the instructions being executable by the processor to:
receive downlink control information (DCI) and a radio resource control (RRC) configuration from a base station, the DCI signaling a first time hopping pattern indication from a plurality of time hopping pattern indications associated with different time hopping patterns that have different mean inter-arrival times between retransmissions;
transmit, using a first time and frequency resource, a scheduling assignment for an initial transmission of a message and a retransmission of the message;
transmit the initial transmission of the message to one or more devices using a second time and frequency resource based at least in part on the scheduling assignment, wherein the message is transmitted in a device-to-device (D2D) transmission;
determine a time hopping pattern for the retransmission of the message corresponding to a second time hopping pattern indication from the plurality of time hopping pattern indications associated with the RRC configuration, the second time hopping pattern indication identifying a time hopping pattern associated with a mean inter-arrival time between retransmissions different from a mean inter-arrival time between retransmissions of the first time hopping pattern indication;
determine a third time and frequency resource based at least in part on a frequency of the second time and frequency resource and the time hopping pattern; and
transmit the retransmission of the message using the third time and frequency resource.

15. The apparatus of claim 14, wherein the time hopping pattern identifies at least the third time and frequency resource as a time and frequency diverse resource relative to the second time and frequency resource.

16. A non-transitory computer-readable medium storing instructions executable by a processor to:
receive downlink control information (DCI) and a radio resource control (RRC) configuration from a base station, the DCI signaling a first time hopping pattern indication from a plurality of time hopping pattern indications associated with different time hopping patterns that have different mean inter-arrival times between retransmissions;
transmit, using a first time and frequency resource, a scheduling assignment for an initial transmission of a message and a retransmission of the message;
transmit the initial transmission of the message to one or more devices using a second time and frequency resource based at least in part on the scheduling assignment, wherein the message is transmitted in a device-to-device (D2D) transmission;
determine a time hopping pattern for the retransmission of the message corresponding to a second time hopping pattern indication from the plurality of time hopping pattern indications associated with the RRC configuration, the second time hopping pattern indication identifying a time hopping pattern associated with a mean inter-arrival time between retransmissions different from a mean inter-arrival time between retransmissions of the first time hopping pattern indication;
determine a third time and frequency resource based at least in part on a frequency of the second time and frequency resource and the time hopping pattern; and
transmit the retransmission of the message using the third time and frequency resource.

17. A method of wireless communications, comprising:
receiving downlink control information (DCI) and a radio resource control (RRC) configuration from a base station, the DCI signaling a first time hopping pattern indication from a plurality of time hopping pattern indications associated with different time hopping patterns that have different mean inter-arrival times between retransmissions;
receiving, using a first time and frequency resource, a scheduling assignment for an initial transmission of a message and a retransmission of the message, the scheduling assignment comprising a second time hopping pattern indication from the plurality of time hopping pattern indications associated with the RRC configuration, the second time hopping pattern indication identifying a time hopping pattern associated with a mean inter-arrival time between retransmissions different from a mean inter-arrival time between retransmissions of the first time hopping pattern indication;
receiving the initial transmission of the message from a device using a second time and frequency resource based at least in part on the scheduling assignment, wherein the message is transmitted in a device-to-device (D2D) transmission;
determining a time hopping pattern for the retransmission of the message corresponding to the second time hopping pattern indication;
determining a third time and frequency resource based at least in part on a frequency of the second time and frequency resource and the time hopping pattern; and
receiving the retransmission of the message using the third time and frequency resource.

18. The method of claim 17, wherein the third time and frequency resource is further determined based at least in part on a target identification included in the scheduling assignment.

19. The method of claim 17, wherein the third time and frequency resource is further determined based at least in part on a subframe number of the second time and frequency resource.

20. The method of claim 17, wherein the time hopping pattern identifies at least the third time and frequency resource as a time and frequency diverse resource relative to the second time and frequency resource.

21. The method of claim 17, wherein the second time hopping pattern indication identifies a number of retransmissions of the message different from a number of retransmissions identified by the first time hopping pattern indication, and wherein the determining at least the third time and frequency resource comprises determining a number of time and frequency resources corresponding to the number of retransmissions identified by the second time hopping pattern indication.

22. The method of claim 17, wherein the scheduling assignment indicates the time hopping pattern for one or more subsequent transmissions of data.

23. An apparatus of wireless communications, comprising a circuit configured to:
receive downlink control information (DCI) and a radio resource control (RRC) configuration from a base station, the DCI signaling a first time hopping pattern indication from a plurality of time hopping pattern indications associated with different time hopping patterns that have different mean inter-arrival times between retransmissions;
receive, using a first time and frequency resource, a scheduling assignment for an initial transmission of a message and a retransmission of the message, the scheduling assignment comprising a second time hopping pattern indication from the plurality of time hopping pattern indications associated with the RRC configuration, the second time hopping pattern indication identifying a time hopping pattern associated with a mean inter-arrival time between retransmissions different from a mean inter-arrival time between retransmissions of the first time hopping pattern indication;
receive the initial transmission of the message from a device using a second time and frequency resource based at least in part on the scheduling assignment, wherein the message is transmitted in a device-to-device (D2D) transmission;
determine a time hopping pattern for the retransmission of the message corresponding to the second time hopping pattern indication;
determine a third time and frequency resource based at least in part on a frequency of the second time and frequency resource and the time hopping pattern; and
receive the retransmission of the message using the third time and frequency resource.

24. The apparatus of claim 23, wherein the time hopping pattern identifies at least the third time and frequency resource as a time and frequency diverse resource relative to the second time and frequency resource.

25. An apparatus of wireless communications, comprising:
a processor;
memory in electronic communication with the processor; and instructions stored in the memory, the instructions being executable by the processor to:
  receive downlink control information (DCI) and a radio resource control (RRC) configuration from a base station, the DCI signaling a first time hopping pattern indication from a plurality of time hopping pattern indications associated with different time hopping patterns that have different mean inter-arrival times between retransmissions;
  receive, using a first time and frequency resource, a scheduling assignment for an initial transmission of a message and a retransmission of the message, the scheduling assignment comprising a second time hopping pattern indication from the plurality of time hopping pattern indications associated with the RRC configuration, the second time hopping pattern indication identifying a time hopping pattern associated with a mean inter-arrival time between retransmissions different from a mean inter-arrival time between retransmissions of the first time hopping pattern indication;
  receive the initial transmission of the message from a device using a second time and frequency resource based at least in part on the scheduling assignment, wherein the message is transmitted in a device-to-device (D2D) transmission;
  determine a time hopping pattern for the retransmission of the message corresponding to the second time hopping pattern indication;
  determine a third time and frequency resource based at least in part on a frequency of the second time and frequency resource and the time hopping pattern; and
  receive the retransmission of the message using the third time and frequency resource.

26. A non-transitory computer-readable medium storing instructions executable by a processor to:
  receive downlink control information (DCI) and a radio resource control (RRC) configuration from a base station, the DCI signaling a first time hopping pattern indication from a plurality of time hopping pattern indications associated with different time hopping patterns that have different mean inter-arrival times between retransmissions;
  receive, using a first time and frequency resource, a scheduling assignment for an initial transmission of a message and a retransmission of the message, the scheduling assignment comprising a second time hopping pattern indication from the plurality of time hopping pattern indications associated with the RRC configuration, the second time hopping pattern indication identifying a time hopping pattern associated with a mean inter-arrival time between retransmissions different from a mean inter-arrival time between retransmissions of the first time hopping pattern indication;
  receive the initial transmission of the message from a device using a second time and frequency resource based at least in part on the scheduling assignment, wherein the message is transmitted in a device-to-device (D2D) transmission;
  determine a time hopping pattern for the retransmission of the message corresponding to the second time hopping pattern indication;
  determine a third time and frequency resource based at least in part on a frequency of the second time and frequency resource and the time hopping pattern; and
  receive the retransmission of the message using the third time and frequency resource.

\* \* \* \* \*